US009467376B2

(12) United States Patent
Shuai (10) Patent No.: US 9,467,376 B2
(45) Date of Patent: Oct. 11, 2016

(54) METHOD AND DEVICE FOR SENDING INTERNET PROTOCOL PACKETS (71) Applicant: Huawei Technologies Co., Ltd., Shenzhen (CN)

(72) Inventor: Ke Shuai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 14/188,176

(22) Filed: Feb. 24, 2014

(65) Prior Publication Data

US 2014/0169377 A1 Jun. 19, 2014

Related U.S. Application Data

(63) Continuation of application No. PCT/CN2012/072251, filed on Mar. 13, 2012.

(30) Foreign Application Priority Data

Aug. 24, 2011 (CN) .......................... 2011 1 0246933

(51) Int. Cl.
| | |
|---|---|
| *H04L 12/741* | (2013.01) |
| *H04L 12/751* | (2013.01) |
| *H04L 12/24* | (2006.01) |
| *H04L 12/707* | (2013.01) |

(52) U.S. Cl.
CPC ............. *H04L 45/745* (2013.01); *H04L 45/02* (2013.01); *H04L 41/12* (2013.01); *H04L 45/22* (2013.01)

(58) Field of Classification Search
CPC ..... H04L 45/745; H04L 45/02; H04L 41/12; H04L 45/22
See application file for complete search history.

(56) References Cited

U.S. PATENT DOCUMENTS

| | | | |
|---|---|---|---|
| 7,379,423 B1 | 5/2008 | Caves et al. | |
| 7,525,949 B1* | 4/2009 | Rampal | ................... H04L 45/02 370/352 |
| 2005/0114648 A1 | 5/2005 | Akundi et al. | |
| 2008/0084888 A1* | 4/2008 | Yadav | ..................... H04L 45/36 370/395.31 |
| 2009/0080436 A1 | 3/2009 | White et al. | |

FOREIGN PATENT DOCUMENTS

| | | |
|---|---|---|
| CN | 1549546 A | 11/2004 |
| CN | 101068178 A | 11/2007 |
| CN | 101159674 A | 4/2008 |
| CN | 101286948 A | 10/2008 |
| CN | 101404619 A | 4/2009 |
| CN | 102316028 A | 1/2012 |

\* cited by examiner

*Primary Examiner* — Ian N Moore
*Assistant Examiner* — Latresa McCallum
(74) *Attorney, Agent, or Firm* — Brinks Gilson & Lione (57) ABSTRACT

An embodiment of the present disclosure provides a method for sending an IP packet. The method includes: acquiring, an IP address and a MAC address of a first network element; sending, the IP address to generate a first table entry; sending, the IP address and the MAC address to generate a second table entry; advertising, a routing message; receiving a first IP packet; forwarding, the first IP packet. An embodiment of the present disclosure further provides a corresponding device. According to the method and the device, a local device communicates with a remote device via a router; there is no need for the router to discover the local device via a routing protocol and dynamically establish and maintain the destination IP address in the routing forward table, as a table entry of the local device, thereby reducing the overhead of the router.

10 Claims, 4 Drawing Sheets

METHOD AND DEVICE FOR SENDING INTERNET PROTOCOL PACKETS

CROSS-REFERENCE TO RELATED APPLICATIONS

This application is a continuation of International Application No. PCT/CN2012/072251, filed on Mar. 13, 2012, which claims priority to Chinese Patent Application No. 201110246933.5, filed on Aug. 24, 2011, both of which are hereby incorporated by reference in their entireties.

FIELD

The present disclosure relates to communication technologies, more particularly, to a method and a device for sending Internet Protocol (IP) packets.

BACKGROUND

Currently, many network elements distributed in different regions are connected through the Internet. For the purpose of reducing the scale of the network and the cost of administrating and maintaining the network, the whole network is divided into different segments by routers. Network elements in the same segment may communicate with each other, and network elements in different segments can not communicate with each other directly; instead, a router is needed to forward IP packets. The communication between the network elements in different segments is realized by implementing routing protocols, such as Internal Gateway Protocol (IGP) and Border Gateway Protocol (BGP).

However, the inventor finds that the prior art exists the following problem:

When a local device communicates, via a router, with a remote device which is not located in the same segment as the local device, the router has to discover the local device according to a routing protocol, and dynamically establishes and maintains, according to information provided by routing messages, a destination IP address in a routing forward table as a table entry of the local device, which increases the overhead of the router.

SUMMARY

According to a method and a device for sending an IP packet provided by embodiments of the present disclosure, when a network element communicates with a foreign network, there is no need to run a routing protocol on the network element, thereby reducing the overhead of the network element.

In one aspect, an embodiment of the present disclosure provides a method for sending an IP packet, comprising: acquiring, by a control plane of a router, an IP address and a media access control (MAC) address of a first network element via PPPoE; sending, by the control plane of the router, the IP address of the first network element to a routing forward table in a data plane of the router to generate a first table entry; a destination IP address of the first table entry is the IP address of the first network element, and an IP address of a next hop in the first table entry is the IP address of the first network element; sending, by the control plane of the router, the IP address and the MAC address of the first network element to an ARP buffer table in the data plane of the router to generate a second table entry; a destination IP address of the second table entry is the IP address of the first network element, and a destination MAC address of the second table entry is the MAC address of the first network element; advertising, by the router, routing message to a neighbor router of the router; the routing message includes the IP address of the first network element; receiving a first IP packet forwarded by the neighbor router; a source IP address of the first IP packet is the IP address of a second network element, a destination IP address of the first IP packet is the IP address of the first network element, and the IP address of the first network element and the IP address of the second network element are in different network segments; and looking up, by the router, the first table entry according to the destination IP address of the first IP packet; looking up, by the router, the second table entry according to the IP address of the next hop in the first table entry; and forwarding, by the router, the first IP packet according to the destination MAC address of the second table entry.

In another aspect, an embodiment of the present disclosure provides another method for sending an IP packet, comprising: acquiring, by a control plane of a first network element, an IP address and a MAC address of a router via PPPoE; sending, by the control plane of the first network element, the IP address of the router to a routing forward table in a data plane of the first network element to generate a third table entry; a destination IP address of the third table entry is a first network segment address, the first network segment address covers an IP address of a second network element, an IP address of a next hop in the third table entry is the IP address of the router, and the IP address of the second network element and the IP address of the first network element are in different network segments; sending, by the control plane of the first network element, the IP address and the MAC address of the router to an ARP buffer table in the data plane of the first network element to generate a fourth table entry; a destination IP address of the fourth table entry is the IP address of the router, and a destination MAC address of the fourth table entry is the MAC address of the router; and sending, by the first network element, a second IP packet to the second network element via the router; looking up, by the first network element, the third table entry according to a destination IP address of the second IP packet; looking up, by the first network element, the fourth table entry according to the IP address of the next hop in the third table entry; sending, by the first network element, the second IP packet according to the destination MAC address of the fourth table entry; and the destination IP address of the second IP packet is the IP address of the second network element.

In another aspect, an embodiment of the present disclosure provides a device for sending an IP packet, comprising: a first acquisition unit, configured to acquire, by a control plane of a router, an IP address and a MAC address of a first network element via PPPoE; a first table entry generation unit, configured to forward, by the control plane of the router, the IP address of the first network element to a routing forward table in a data plane of the router to generate a first table entry; a destination IP address of the first table entry is the IP address of the first network element, and an IP address of a next hop in the first table entry is the IP address of the first network element; a second table entry generation unit, configured to forward, by the control plane of the router, the IP address and the MAC address of the first network element to an ARP buffer table in the data plane of the router to generate the second table entry; a destination IP address of the second table entry is the IP address of the first network element, and a destination MAC address of the second table entry is the MAC address of the first network element; a routing message advertising unit, configured to advertise, by the router, routing message to a neighbor router of the router; the routing message includes the IP address of the first network element; a receiving unit, configured to receive a first IP packet forwarded by the neighbor router; a source IP address of the first IP packet is an IP address of a second network element, a destination IP address of the first IP packet is the IP address of the first network element, and the IP address of the first network element and the IP address of the second network element are in different network segments; a first sender, configured to look up, by the router, the first table entry according to the destination IP address of the first IP packet; look up, by the router, the second table entry according to the IP address of the next hop in the first table entry; and forward, by the router, the first IP packet according to the destination MAC address of the second table entry.

In another aspect, an embodiment of the present disclosure provides another device for sending an IP packet, comprising: a second acquisition unit, configured to acquire, by a control plane of a first network element, an IP address and a MAC address of a router via PPPoE; a third table entry generation unit, configured to forward, by the control plane of the first network element, the IP address of the router to a routing forward table in a data plane of the first network element to generate a third table entry; a destination IP address of the third table entry is a first network segment address, the first network segment address covers an IP address of a second network element, an IP address of a next hop in the third table entry is the IP address of the router, and the IP address of the second network element and an IP address of the first network element are in different network segments; a fourth table entry generation unit, configured to forward, by the control plane of the first network element, the IP address and the MAC address of the router to an ARP buffer table in the data plane of the first network element to generate a fourth table entry; a destination IP address of the fourth table entry is the IP address of the router, and a destination MAC address of the fourth table entry is the MAC address of the router; and a second sender, configured to send, by the first network element, a second IP packet to the second network element via the router; look up, by the first network element, the third table entry according to a destination IP address of the second IP packet; look up, by the first network element, the fourth table entry according to the IP address of the next hop in the third table entry; send, by the first network element, the second IP packet according to the destination MAC address of the fourth table entry; and the destination IP address of the second IP packet is the IP address of the second network element.

According to the method and the device of the embodiments of the present disclosure, a local device communicates, via a router, with a remote device which is not located in the same segment as the local device; there is no need for the router to discover an accessing device according to the routing protocol and dynamically establish and maintain, according to information provided by routing message, the destination IP address in the routing forward table as the table entry of the local device, thereby decreasing the overhead of the router.

BRIEF DESCRIPTION OF THE DRAWINGS

In order to clearly describe solutions of the embodiments of the present disclosure or of prior arts, the drawings for illustrating the embodiments or the conventional arts will be briefly described in the following. It is obvious that the described drawings are only related to some embodiments of the present disclosure, and those skilled in the art may arrive at other drawings based on these described drawings without any inventive work.

DETAILED DESCRIPTION OF THE PREFERRED EMBODIMENTS

In order to make objects, solutions and advantages of the embodiments of the present disclosure apparent, solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiments, without any inventive work, which should be within the scope of the present disclosure.

Figure 1:
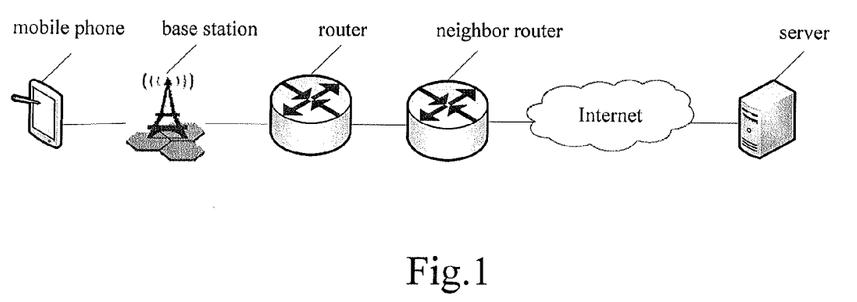
FIG. 1 illustrates a networking configuration in which a method and a device for sending an IP packet in accordance with an embodiment of the present disclosure are applied for a certain scenario.

In accordance with a method and a device for sending IP packets as provided by embodiments of the present disclosure, in case that a local device communicates, via a router, with a remote device which is not located in the same network segment as the local device, there is no need for the router to discover the local device by a routing protocol and to dynamically establish and maintain, according to information provided by a routing message, a destination IP address in a routing forward table, as a table entry of the local device, thereby decreasing the overhead of the router. FIG. 1 illustrates a networking configuration in which an embodiment of the present disclosure is applied for a certain scenario.

The networking configuration of FIG. 1 includes the Internet and three network elements. The three network elements are respectively a mobile phone, a base station and a router. A wireless link is established between the mobile phone and the base station, a wired link is established between the base station and the router, and the router is connected to the Internet. The mobile phone may access the Internet via the base station and the router.

First Embodiment

Figure 2:
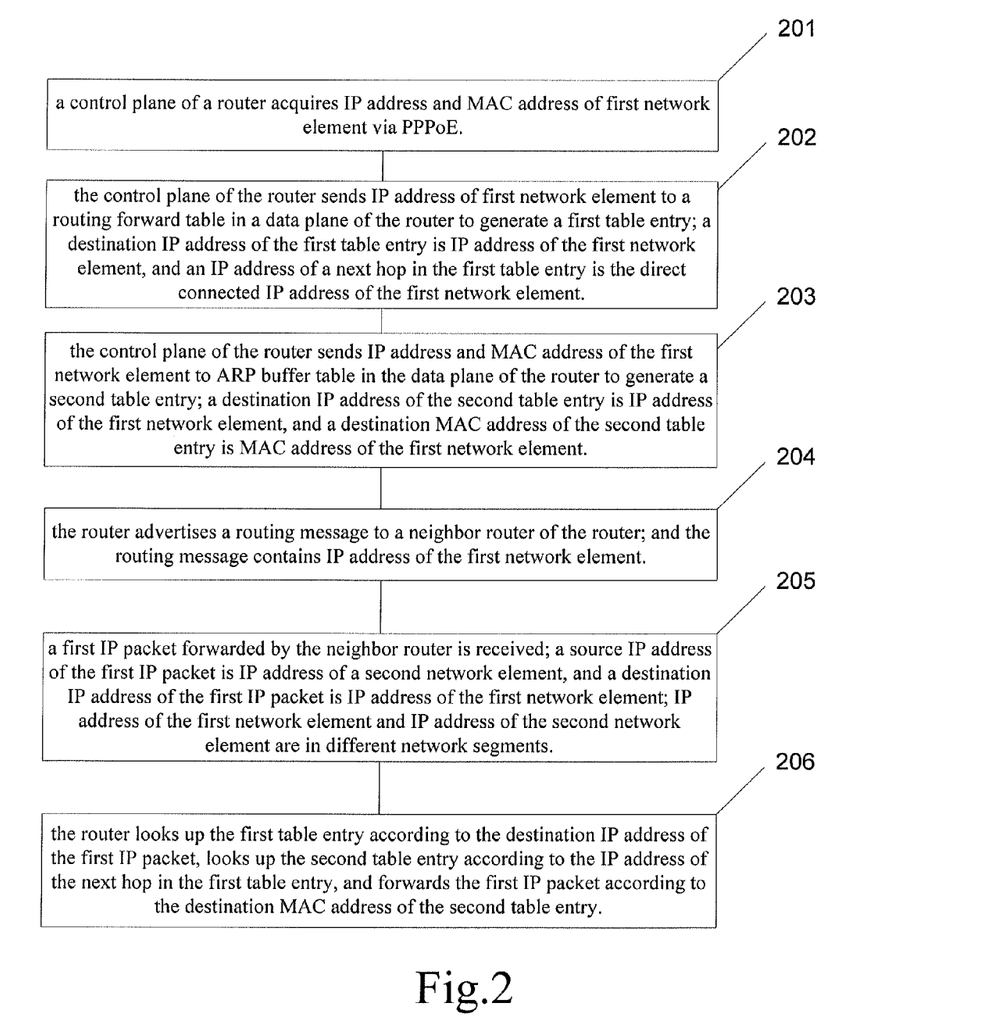
FIG. 2 illustrates a flow chart of a method for sending an IP packet in accordance with an embodiment of the present disclosure.

The embodiment provides a method for sending an IP packet, and is applicable to a scenario of mobile IP. FIG. 2 shows a flow chart of the method for sending an IP packet according to the embodiment of the present disclosure. The method includes:

201: a control plane of a router acquires an IP address and a Media Access Control (MAC) address of a first network element via Point-to-Point Protocol over Ethernet (PPPoE).

Specifically, the first network element may be a stationary or a mobile network element. The stationary network element may be a router or a switch, and the mobile network element may be a mobile terminal or a virtual machine. The mobile terminal may be a mobile phone, a Personal Digital Assistant (PDA) or a portable Personal Computer (PC). The first network element may be connected to the router directly or via an IP layer accessing device. The control plane of the router acquires the IP address and the MAC address of the first network element via PPPoE. Specifically, the first network element may broadcast, in a broadcast domain, a discovery message as defined by PPPoE. The router is located in the broadcast domain of the first network element. The discovery message carries the IP address and the MAC address of the first network element. After receiving the discovery message, the router may send a response message to first network element. The response message may carry the IP address and the MAC address of the router.

Furthermore, the IP address and the MAC address of the first network element may be acquired by extending an existing protocol, for example, by extending the existing Dynamic Host Configuration Protocol (DHCP). As an example, a reserved Option type of DHCP may be defined as a new address acquisition protocol. The router may acquire the IP address and the MAC address of the first network element via the new address acquisition protocol. Specifically, the reserved Option type may include five fields, which are respectively subtype, source IP address, source MAC address, destination IP address, and destination MAC address. The subtype may include two types. When a value of subtype is 1, the DHCP message is a first-time message; when the value of subtype is 2, the DHCP message is a second-time message. The router broadcasts a first-time discovery message in the broadcast domain. The first network element is in the broadcast domain and returns a corresponding response message to the router after receiving the first-time discovery message. The source MAC address of the first-time discovery message is the MAC address of the router. The source MAC address of the response message corresponding to the first-time discovery message is the MAC address of the first network element, the source IP address of the response message is the IP address of the first network element, the destination MAC address of the response message is the MAC address of the router, and the destination IP address of the response message is the IP address of the router. The destination IP address of the response message corresponding to the first-time discovery message is allocated for the router by the first network element. Upon receiving the response message corresponding to the first-time discovery message, the router sends a second-time discovery message to the first network element. The source MAC address, the source IP address, the destination MAC address and the destination IP address of the second-time discovery message are respectively the MAC address of the router, the IP address of the router, the MAC address of the first network element and the IP address of the first network element. After receiving the second-time discovery message, the first network element checks the source MAC address, the source IP address, the destination MAC address and the destination IP address of the second-time discovery message. If the source MAC address, the source IP address, the destination MAC address and the destination IP address of the second-time discovery message are respectively the MAC address of the router, the IP address of the router, the MAC address of the first network element and the IP address of the first network element, the first network element returns a corresponding response message to the router. In this way, the router acquires the IP address and the MAC address of the first network element through the extended DHCP. Meanwhile, the first network element also acquires the IP address and the MAC address of the router.

The IP address of the first network element may be an IP address of an interface of the first network element or an IP address of a service of the first network element. The service may be a video stream service or an audio stream service of the first network element. When the IP address of the first network element is the IP address of an interface of the first network element, the interface of the first network element may be a physical interface or a logical interface. The logical interface may be a Loopback interface or a Tunnel interface. The Tunnel may be a Layer 2 Tunneling Protocol (L2TP) tunnel, a Generic Route Encapsulation (GRE) tunnel or a Multi-Protocol Label Switching (MPLS) tunnel.

The MAC address of the first network element may be a MAC address of an interface of the first network element. The MAC address of the interface of the first network element may be a MAC address of a physical interface or a logical interface of the first network element. When the MAC address of the first network element is the MAC address of a logical interface of the first network element, the logical interface may be a Virtual Ethernet (VE) interface or a sub-interface corresponding to a physical interface of the first network element. The sub-interface may be determined according to the IP address of the physical interface and a Virtual Local Area Network (VLAN) tag of the first network element.

As shown in FIG. 1, a mobile phone is the first network element. The control plane of the router obtains the IP address and the MAC address of the mobile phone via PPPoE. The mobile phone is connected to the router via the base station.

202: the control plane of the router sends the IP address of the first network element to a routing forward table in a data plane of the router to generate a first table entry. A destination IP address of the first table entry is the IP address of the first network element, and an IP address of a next hop in the first table entry is the direct connected IP address of the first network element.

The control plane of the router sends the IP address of the first network element to a routing forward table in the data plane of the first network element, so that the routing forward table of the first network element has a first table entry. A destination IP address of the first table entry is the IP address of the first network element, and an IP address of a next hop in the first table entry is the IP address of the first network element. In this way, the IP address of the next hop may be acquired by looking up the first table entry, when the router forwards an IP packet having a destination IP address which is the IP address of the first network element.

As shown in FIG. 1, the control plane of the router forwards the IP address of the mobile phone to the routing forward table in the data plane of the router.

203: the control plane of the router sends the IP address and the MAC address of the first network element to an Address Resolution Protocol (ARP) buffer table in the data plane of the router to generate a second table entry. A destination IP address of the second table entry is the IP address of the first network element, and a destination MAC address of the second table entry is the MAC address of the first network element.

The control plane of the router sends the IP address and the MAC address of the first network element to the ARP buffer table in the data plane of the router, so that the ARP buffer table of the first network element has a second table entry. A destination IP address of the second table entry is the IP address of the first network element, and a MAC address of the second table entry is the MAC address of the first network element. In this way, a next hop MAC address may be obtained through the second table entry, when the router forwards an IP packet having an IP address of a next hop which is the IP address of the first network element.

As shown in FIG. 1, the control plane of the router sends the IP address and the MAC address of the mobile phone to the ARP buffer table in the data plane of the router.

204: the router advertises a routing message to a neighbor router of the router. The routing message includes the IP address of the first network element.

The router advertises the routing message to the neighbor router; and the routing message includes the IP address of the first network element. In this way, when the neighbor router forwards a IP packet having a destination IP address which is of the IP address of the first network element, an IP address of a next hop in the IP packet may be obtained via the routing forward table of the neighbor router. The routing message may be advertised to the neighbor router by the routing protocol. Specifically, the routing message may be advertised via BGP or IGP.

As shown in FIG. 1, the router advertises, via BGP, the routing message including the IP address of the mobile phone to the neighbor router. In this way, when the neighbor router forwards a IP packet having a destination IP address which is the IP address of the mobile phone, an IP address of a next hop in the IP packet may be obtained by the routing forward table of the neighbor router.

205: a first IP packet forwarded by the neighbor router is received. A source IP address of the first IP packet is the IP address of a second network element, and a destination IP address of the first IP packet is the IP address of the first network element. The IP address of the first network element and the IP address of the second network element are in different network segments.

The neighbor router looks up the routing forward table and forwards the first IP packet to the router. The router receives the first IP packet forwarded by the neighbor router. The destination IP address of the first IP packet is the IP address of the first network element, and the source IP address of the first IP packet is the IP address of the second network element. The first and second network elements are located in different network segment. Specifically, the first and second network elements may be located in different network segments of an Internet Protocol version 4 (IPv4) network or different network segments of an Internet Protocol version 6 (IPv6) network.

As shown in FIG. 1, a server is the second network element. The server is connected to the neighbor router via the Internet. The server and the mobile phone are located in different network segments. The server sends a first IP packet to the mobile phone via the Internet. The destination IP address of the first IP packet is the IP address of the mobile phone. The neighbor router receives the first IP packet.

206: the router looks up the first table entry according to the destination IP address of the first IP packet. The router looks up the second table entry according to the IP address of the next hop in the first table entry. The router forwards the first IP packet according to the destination MAC address of the second table entry.

The router looks up the first table entry according to the destination IP address of the first IP packet, looks up the second table entry according to the IP address of the next hop in the first table entry, and forwards the first IP packet according to the destination MAC address of the second table entry.

As shown in FIG. 1, the router looks up the first table entry according to the destination IP address of the first IP packet, looks up the second table entry according to the IP address of the next hop in the first table entry, and sends the first IP packet according to the destination MAC address of the second table entry. In this way, the mobile phone can receive the first IP packet forwarded by the server.

According to the method for sending an IP packet as provided by the embodiment of the present disclosure, the router acquires the IP address and the MAC address of the local device via PPPoE. The router establishes table entries of the routing forward table and table entries of the ARP buffer table according to the IP address and the MAC address of the local device. The remote device is not in the same network segment as the local device and can send IP packets to the local device via the router. The router acquires IP address and MAC address of the local device via PPPoE. In this way, there is no need for the router to discover the local device by the routing protocol and dynamically establish and maintain, according to information provided by a routing message, the destination IP address in the routing forward table, as the table entry of the local device, thereby decreasing the overhead of the router.

Furthermore, according to the method for sending an IP packet as provided by the embodiment of the present disclosure, the router acquires the IP address and the MAC address of the local device via PPPoE. The method for sending an IP packet does not have specific requirement and limitation on the IP address of the local device. The IP address of the local device thus can be an IP address in a specific network segment and remain unchanged. This means that a local device crossing different network segments can communicate with a remote device using a fixed IP address, when the local device is a mobile network element.

Optionally, the IP address of the first network element is an IP address of a first interface of the first network element, the MAC address of the first network element is a MAC address of the first interface of the first network element, and the router communicates with the first network element via the first interface.

Optionally, the process that the control plane of the router acquiring the IP address and the MAC address of the first network element via PPPoE specifically includes:

the router receives the discovery message sent by the first network element; and the discovery message carries the IP address and the MAC address of the first network element.

Optionally, the router and the first network element are connected via an IP layer network accessing device.

The IP layer network accessing device may transparently transmit an IP packet. The IP layer network accessing device may be a base station.

With reference to FIG. 1, the base station is the IP layer network accessing device. The router and the mobile are connected via the base station.

Second Embodiment

Figure 3:
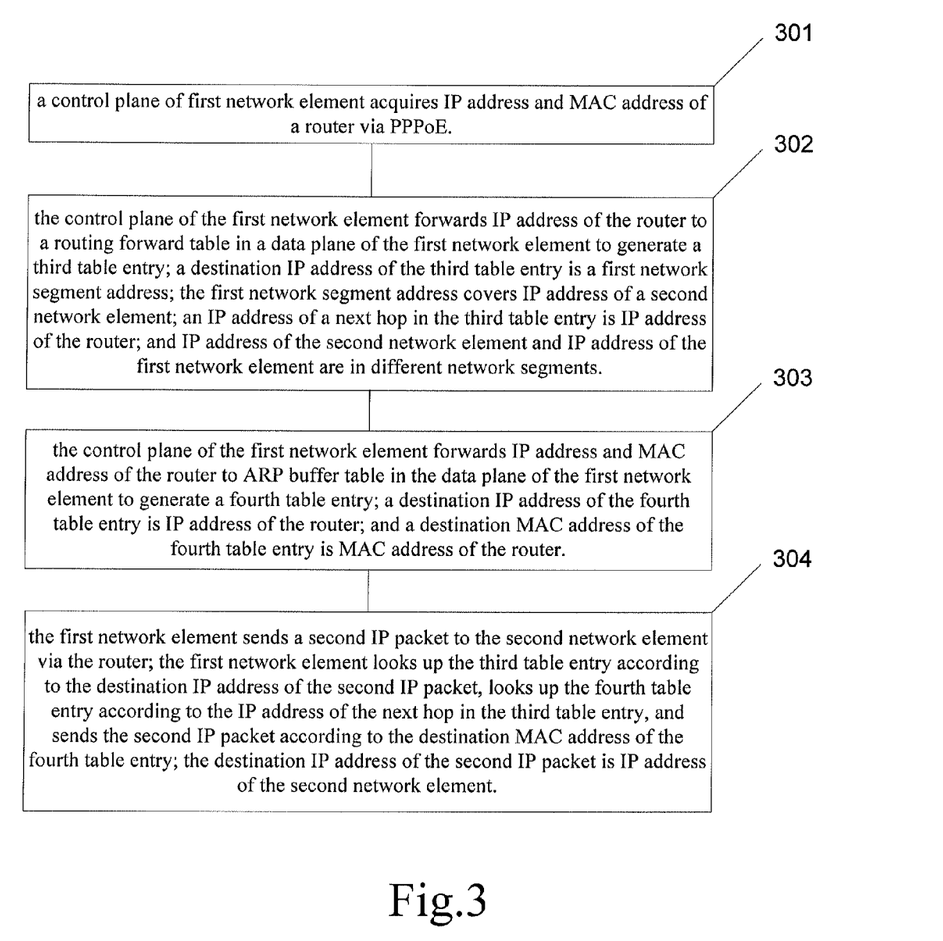
FIG. 3 illustrates a flow chart of another method for sending an IP packet in accordance with an embodiment of the present disclosure.

The embodiment of the present disclosure provides another method for sending an IP packet; and the method is applicable to a scenario of a mobile IP. FIG. 3 shows a flow chart of the method for sending an IP packet as provided by the embodiment of the present disclosure. The method includes the following steps:

301: a control plane of a first network element acquires an IP address and a MAC address of a router via PPPoE.

The step 201 of the first embodiment explains details that the control plane of the first network element acquires the IP address and the MAC address of the router via PPPoE.

The IP address of the router may be an IP address of an interface of the router or an IP address of a service of the router. The service may be a video stream service or audio stream service of the router. When the IP address of the router is the IP address of an interface of the router, the interface may be a physical interface or a logical interface. The logical interface may be a Loopback interface or a Tunnel interface. The Tunnel may be a L2TP tunnel, a GRE tunnel or a MPLS tunnel.

The MAC address of the router may be an MAC address of an interface of the router. The MAC address of an interface of the router may be an MAC address of a physical interface or a logical interface of the router. When the MAC address of the router is the MAC address of a logical interface of the router, the logical interface may be a VE interface or a sub-interface corresponding to a physical interface of the router. The sub-interface may be determined according to the IP address of the physical interface and a VLAN tag of the router.

302: the control plane of the first network element forwards the IP address of the router to a routing forward table in a data plane of the first network element to generate a third table entry. A destination IP address of the third table entry is a first network segment address. The first network segment address covers an IP address of a second network element. An IP address of a next hop in the third table entry is the IP address of the router. The IP address of the second network element and the IP address of the first network element are in different network segments.

The control plane of the first network element sends the IP address of the router to a routing forward table in the data plane of the first network element to generate the third table entry. The destination IP address of the third table entry is the first network segment address. The first network segment address covers the IP address of a second network element. The process of generating the third table entry is similar to that of generating the first table entry, which is explained in step 202 of the first embodiment.

303: the control plane of the first network element forwards the IP address and the MAC address of the router to an ARP buffer table in the data plane of the first network element to generate a fourth table entry. A destination IP address of the fourth table entry is the IP address of the router; and a destination MAC address of the fourth table entry is the MAC address of the router.

The control plane of the first network element sends the IP address and the MAC address of the router to the ARP buffer table in the data plane of the first network element, to generate the fourth table entry. The destination IP address of the fourth table entry is the IP address of the router; and the MAC address of the fourth table entry is the MAC address of the router. The process of generating the fourth table entry is similar to that of generating the second table entry, and is explained in the step 203 of the first embodiment.

304: the first network element sends a second IP packet to the second network element via the router. The first network element looks up the third table entry according to the destination IP address of the second IP packet. The first network element looks up the fourth table entry according to the IP address of the next hop in the third table entry, and sends the second IP packet according to the destination MAC address of the fourth table entry. The destination IP address of the second IP packet is the IP address of the second network element.

The first network element looks up the third table entry according to the destination IP address of the second IP packet, looks up the fourth table entry according to the IP address of the next hop in the third table entry, and sends the second IP packet according to the destination MAC address of the fourth table entry. The process of sending the second IP packet by the first network element is similar to that of sending the first IP packet by the router, and is explained in the step 206 of the first embodiment.

According to the method for sending an IP packet as provided by the embodiment of the present disclosure, a local device acquires the IP address and the MAC address of the router via PPPoE, and establishes table entries of the routing forward table and table entries of the ARP buffer table according to the IP address and the MAC address of the router. The local device can send, via the router, an IP packet to a remote device which is not in the same network segment as the local device. In this way, there is no need for the local device to discover the router by a routing protocol and dynamically establish and maintain, according to information provided by a routing message, the destination IP address in the routing forward table of the local device, as the table entry of the remote device, thereby reducing the overhead of the local device.

Furthermore, according to the method for sending an IP packet as provided by the embodiment of the present disclosure, the local device acquires the IP address and the MAC address of the router via PPPoE. The method for sending an IP packet does not have specific requirement and limitation on the IP address of the local device. The IP address of the local device thus may be an IP address in a specific network segment and remain unchanged. This means that a local device crossing different network segments can communicate with a remote device using a fixed IP address, when the local device is a mobile network element.

Optionally, the IP address of the router is an IP address of a second interface of the router, and a MAC address of the router is a MAC address of the second interface of the router. The first network element communicates with the router via the second interface.

Optionally, the router and the first network element are connected via an IP layer network accessing device.

As shown in FIG. 1, the base station is the IP layer network accessing device; and the router and the mobile phone are connected via the base station.

Third Embodiment

Figure 4:
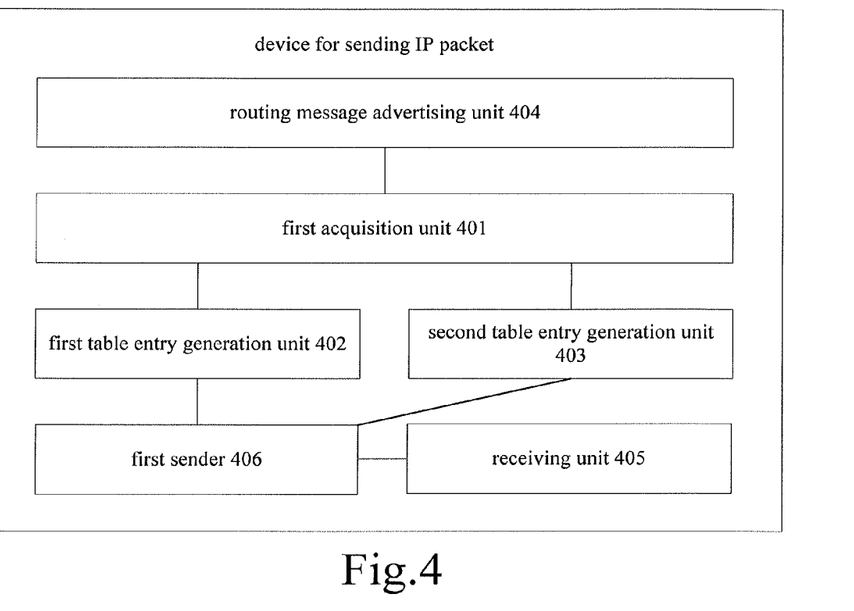
FIG. 4 illustrates a device for sending an IP packet in accordance with an embodiment of the present disclosure.

The embodiment of the present disclosure provides a device for sending an IP packet, which is applicable to a scenario of a mobile IP. The device for sending an IP packet may be the router as shown in FIG. 1. FIG. 4 shows a schematic configuration of the device for sending an IP packet as provided by the embodiment of the present disclosure. The device includes: a first acquisition unit 401, a first table entry generation unit 402, a second table entry generation unit 403, a routing message advertising unit 404, a receiving unit 405, and first sender 406.

The first acquisition unit 401 is configured to acquire, by a control plane of a router, an IP address and a MAC address of a first network element via PPPoE.

Specifically, the first network element may be a stationary or mobile network element. The stationary network element may be a router or a switch, and the mobile network element may be a mobile terminal or a virtual machine. The mobile terminal may be a mobile phone, a PDA or a Portable PC.

The first network element may be connected to the router directly or via an IP layer accessing device. The control plane of the router acquires the IP address and the MAC address of the first network element via PPPoE. Specifically, the first network element may broadcast, in a broadcast domain, a discovery message as defined by PPPoE. The router is in the broadcast domain of the first network element. The discovery message carries the IP address and the MAC address of the first network element. After receiving the discovery message, the router may send, to first network element, a response message which may carry the IP address and the MAC address of the router.

Furthermore, the IP address and the MAC address of the first network element may be acquired by extending an existing protocol, such as the existing DHCP. For example, a reserved Option type of DHCP may be defined as a new address acquisition protocol. By the new address acquisition protocol, the router may acquire the IP address and the MAC address of the first network element. Specifically, the reserved Option type may include five fields, which are a subtype, a source IP address, a source MAC address, a destination IP address, and a destination MAC address, respectively. The subtype may include two types. When a value of subtype is 1, the DHCP message is a first-time message; when a value of subtype is 2, the DHCP message is a second-time message. The router broadcasts a first-time discovery message in a broadcast domain. The first network element is in the broadcast domain and returns a corresponding response message to the router after receiving the first-time discovery message. The source MAC address of the first-time discovery message is the MAC address of the router. The source MAC address of the response message corresponding to the first-time discovery message is the MAC address of the first network element, the source IP address of the response message is the IP address of the first network element, the destination MAC address of the response message is the MAC address of the router, and the destination IP address of the response message is the IP address of the router. The destination IP address of the response message corresponding to the first-time discovery message is allocated for the router by the first network element. Upon receiving the response message corresponding to the first-time discovery message, the router sends a second-time discovery message to the first network element. A source MAC address, a source IP address, a destination MAC address and a destination IP address of the second-time discovery message are respectively the MAC address of the router, the IP address of the router, the MAC address of the first network element and the IP address of the first network element. After receiving the second-time discovery message, the first network element checks the source MAC address, the source IP address, the destination MAC address and the destination IP address of the second-time discovery message one by one. If the source MAC address, the source IP address, the destination MAC address and the destination IP address of the second-time discovery message are respectively the MAC address of the router, the IP address of the router, the MAC address of the first network element and the IP address of the first network element, the first network element returns a corresponding response message to the router. In this way, the router acquires the IP address and the MAC address of the first network element through the extended DHCP. Meanwhile, the first network element also acquires the IP address and the MAC address of the router.

The IP address of the first network element may be the IP address of an interface of the first network element or an IP address of a service of the first network element. The service may be a video stream service or audio stream service of the first network element. When the IP address of the first network element is the IP address of an interface of the first network element, the interface of the first network element may be a physical interface or a logic interface. The logic interface may be a Loopback interface or a Tunnel interface. The Tunnel may be a L2TP tunnel, a GRE tunnel or a MPLS tunnel.

The MAC address of the first network element may be the MAC address of an interface of the first network element. The MAC address of an interface of the first network element may be a MAC address of a physical interface or a logical interface of the first network element. When the MAC address of the first network element is the MAC address of a logical interface of the first network element, the logic interface may be a VE interface or a sub-interface corresponding to a physical interface of the first network element. The sub-interface may be determined according to the IP address of the physical interface and a VLAN tag of the first network element.

As shown in FIG. 1, a mobile phone is the first network element. The control plane of the router obtains the IP address and the MAC address of the mobile phone via PPPoE. The mobile phone is connected to the router via the base station.

The first table entry generation unit 402 is configured to send, by the control plane of the router, the IP address of the first network element to a routing forward table in the data plane of the router to generate a first table entry. A destination IP address of the first table entry is the IP address of the first network element, and an IP address of a next hop in the first table entry is the IP address of the first network element.

The control plane of the router sends the IP address of the first network element to a routing forward table in the data plane of the first network element, so that the routing forward table of the first network element includes a first table entry. A destination IP address of the first table entry is the IP address first network element, and an IP address of a next hop in the first table entry is the IP address of the first network element. In this way, the IP address of the next hop may be acquired by looking up the first table entry, when the router forwards an IP packet having a destination IP address which is the IP address of the first network element.

As shown in FIG. 1, the control plane of the router sends the IP address of the mobile phone to the routing forward table in the data plane of the router.

The second table entry generation unit 403 is configured to send, by the control plane of the router, the IP address and the MAC address of the first network element to an ARP buffer table in the data plane of the router to generate a second table entry. A destination IP address of the second table entry is the IP address of the first network element, and a destination MAC address of the second table entry is the MAC address of the first network element.

The control plane of the router sends the IP address and the MAC address of the first network element to the ARP buffer table in the data plane of the router, so that the ARP buffer table of the router has a second table entry. A destination IP address of the second table entry is the IP address of the first network element, and a MAC address of the second table entry is the MAC address of the first network element. In this way, a next hop MAC address of the second table entry may be obtained through the second table entry, when the router forwards an IP packet having an IP address of a next hop which is the IP address of the first network element.

As shown in FIG. 1, the control plane of the router sends the IP address and the MAC address of the mobile phone to the ARP buffer table in the data plane of the router.

The routing message advertising unit 404 is configured to advertise a routing message from the router to a neighbor router of the router. The routing message includes the IP address of the first network element.

In this way, when the neighbor router forwards an IP packet having a destination IP address which is the IP address of the first network element, an IP address of a next hop in the IP packet may be obtained via a routing forward table of the neighbor router. The router may advertise the routing message to the neighbor router via a routing protocol, such as BGP or IGP.

As shown in FIG. 1, the router advertises the routing message to the neighbor router via BGP, and the routing message includes the IP address of the mobile phone. In this way, when the neighbor router forwards an IP packet having a destination IP address which is the IP address of the mobile phone, an IP address of a next hop in the IP packet may be obtained by the routing forward table of the neighbor router.

The receiving unit 405 is configured to receive a first IP packet forwarded by the neighbor router. A source IP address of the first IP packet is an IP address of a second network element, and a destination IP address of the first IP packet is the IP address of the first network element. The IP address of the first network element and the IP address of the second network element are in different network segments.

The neighbor router looks up the routing forward table and forwards the first IP packet to the router. The router receives the first IP packet forwarded by the neighbor router. The destination IP address of the first IP packet is the IP address of the first network element, and the source IP address of the first IP packet is the IP address of the second network element. The first and second network elements are located in different network segments. Specifically, the first and second network element may be located in different segments of an IPv4 network or different segments of an IPv6 network.

As shown in FIG. 1, the server is the second network element, and is connected to the neighbor router via the Internet. The server and the mobile phone are located in different network segments. The server sends the first IP packet to the mobile phone via the Internet. The destination IP address of the first IP packet is the IP address of the mobile phone. The neighbor router receives the first IP packet.

The first sender 406 is configured to look up, by the router, the first table entry according to the destination IP address of the first IP packet. The router looks up the second table entry according to the IP address of the next hop in the first table entry, and forwards the first IP packet according to the destination MAC address of the second table entry.

As shown in FIG. 1, the router looks up the first table entry according to the destination IP address of the first IP packet, and looks up the second table entry according to the IP address of the next hop in the first table entry. The router sends the first IP packet according to the destination MAC address of the second table entry. In this way, the mobile phone can receive the first IP packet forwarded by the server.

According to the device for sending an IP packet as provided by the embodiment of the present disclosure, the router acquires the IP address and the MAC address of the local device via PPPoE, and establishes table entries of the routing forward table and table entries of the ARP buffer table according to the IP address and the MAC address of the local device. The remote device is not in the same network segment as the local device, and can send an IP packet to the local device via the router. The router acquires the IP address and the MAC address of the local device via PPPoE. In this way, there is no need for the router to discover the local device via the routing protocol and dynamically establish and maintain, according to information provided by a routing message, the destination IP address in the routing forward table, as the table entry of the local device, thereby reducing the overhead of the router.

Furthermore, according to the device of the embodiment of the present disclosure, the router acquires the IP address and the MAC address of the local device via PPPoE. The device for sending an IP packet does not have specific requirement and limitation on the IP address of the local device. The IP address of the local device thus may be an IP address in a specific network segment and remain unchanged. This means that the local device crossing different network segments can communicate with the remote device using a fixed IP address, when the local device is a mobile network element.

Fourth Embodiment

Figure 5:
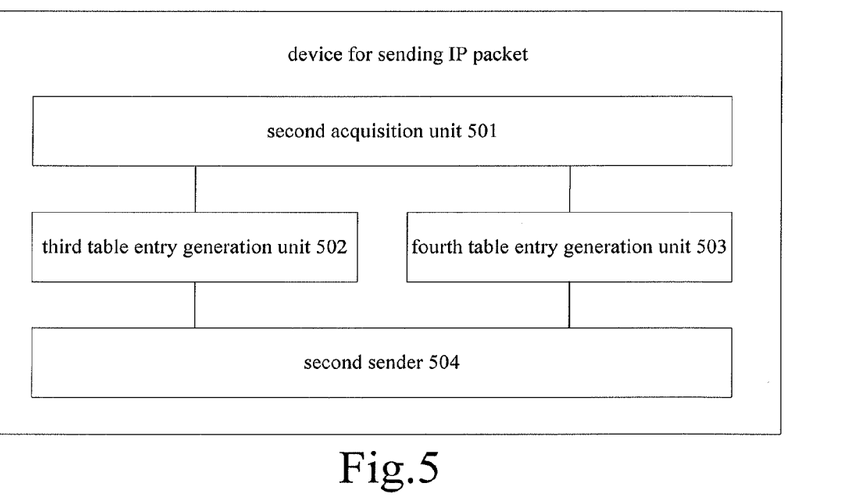
FIG. 5 illustrates another device for sending an IP packet in accordance with an embodiment of the present disclosure.

The embodiment of the present disclosure provides another device for sending an IP packet and is applicable to a scenario of mobile IP. The device for sending an IP packet may be the router as shown in FIG. 1. FIG. 5 shows a schematic configuration of the device for sending an IP packet as provided by the embodiment of the present disclosure. The device includes: a second acquisition unit 501, a third table entry generation unit 502, a fourth table entry generation unit 503, and a second sender 504.

The second acquisition unit 501 is configured to acquire, by a control plane of a first network element, an IP address and a MAC address of a router via PPPoE.

The step 301 of the second embodiment explains the process of acquiring the IP address and the MAC address of the router via PPPoE by the control plane of the first network element.

The IP address of the router may be an IP address of an interface of the router or an IP address of a service of the router. The service may be a video stream service or audio stream service of the router. When the IP address of the router is an IP address of an interface of the router, the interface may be a physical interface or a logical interface. The logical interface may be a Loopback interface or a Tunnel interface. The Tunnel may be a L2TP tunnel, a GRE tunnel or a MPLS tunnel.

The MAC address of the router may be an MAC address of an interface of the router. The MAC address of an interface of the router may be the MAC address of a physical interface or a logical interface of the router. When the MAC address of the router is the MAC address of a logical interface of the router, the logical interface may be a VE interface or a sub-interface corresponding to a physical interface of the router. The sub-interface may be determined according to the IP address of the physical interface and a VLAN tag of the router.

The third table entry generation unit 502 is configured to send, by the control plane of the first network element, the IP address of the router to a routing forward table in the data plane of the first network element to generate a third table entry. A destination IP address of the third table entry is a first network segment address. The first network segment address covers an IP address of a second network element. An IP address of a next hop in the third table entry is the IP address of the router. The IP address of the second network element and the IP address of the first network element are in different network segments.

The step 302 of the second embodiment 2 explains the process of generating the third table entry.

The fourth table entry generation unit 503 is configured to send, by the control plane of the first network element, the IP address and the MAC address of the router to an ARP buffer table in the data plane of the first network element to generate a fourth table entry. A destination IP address of the fourth table entry is the IP address of the router, and a destination MAC address of the fourth table entry is the MAC address of the router.

The process of generating the fourth table entry is explained in the step 303 of the second embodiment.

The second sender 504 is configured to send, by the first network element, a second IP packet to the second network element via the router. The first network element looks up the third table entry according to the destination IP address of the second IP packet, and looks up the fourth table entry according to the IP address of the next hop in the third table entry. The first network element sends the second IP packet according to the destination MAC address of the fourth table entry, and the destination IP address of the second IP packet is the IP address of the second network element.

The process of sending the second IP packet by the first network element is explained in the step 304 of the second embodiment.

According to the device for sending an IP packet as provided by the embodiment of the present disclosure, the local device acquires the IP address and the MAC address of the router via PPPoE, and establishes table entries of the routing forward table and table entries of the ARP buffer table according to the IP address and the MAC address of the router. The local device can send an IP packet, through the router, to a remote device which is in a different network segment from the local device. In this way, there is no need for the local device to discover the router via a routing protocol and dynamically establish and maintain, according to information provided by a routing message, the destination IP address in the routing forward table, as a table entry of the remote device, thereby reducing the overhead of the local device.

Furthermore, according to the device for sending an IP packet as provided by the embodiment of the present disclosure, the local device acquires the IP address and the MAC address of the router via PPPoE. The device for sending an IP packet does not have specific requirement and limitation on the IP address of the local device. The IP address of the local device thus may be an IP address in a specific network segment and remain unchanged. This means that a local device crossing different network segments can communicate with a remote device by using a fixed IP address, when the local device is a mobile network element.

It can be understood by those skilled in the art that a part or all of the steps in the method embodiments as stated above may be realized by a computer program giving instructions to related hardware, and the program may be stored on a computer readable storage medium and may perform the steps of the method embodiments as stated above when it is executed. The storage medium includes ROM, RAM, a magnetic disk, an optical disk, or other media capable of storing program codes.

It is noted that the embodiments as stated above are illustrative and not limitative to the scope of the present disclosure. Though the present disclosure is described in detail with reference to the above embodiments, it may be understood by those skilled in the art that modification and equivalent replacement to the solutions as stated above may be done without departing from the spirit and scope of embodiments of the present disclosure.

What is claimed is:

1. A method for sending an Internet Protocol (IP) packet, comprising:
    acquiring, by a control plane of a router, an IP address and a media access control (MAC) address of a first network element via Point-to-Point Protocol over Ethernet (PPPoE);
    sending, by the control plane of the router, the IP address of the first network element to a routing forward table in a data plane of the router to generate a first table entry; wherein a destination IP address of the first table entry is the IP address of the first network element, and an IP address of a next hop in the first table entry is the IP address of the first network element;
    sending, by the control plane of the router, the IP address and the MAC address of the first network element to an Address Resolution Protocol (ARP) buffer table in the data plane of the router to generate a second table entry; wherein a destination IP address of the second table entry is the IP address of the first network element, and a destination MAC address of the second table entry is the MAC address of the first network element;
    advertising, by the router, a routing message to a neighbor router of the router; wherein the routing message comprises the IP address of the first network element;
    receiving a first IP packet forwarded by the neighbor router; wherein a source IP address of the first IP packet is an IP address of a second network element, a destination IP address of the first IP packet is the IP address of the first network element, and the IP address of the first network element and the IP address of the second network element are in different network segments;
    looking up, by the router, the first table entry according to the destination IP address of the first IP packet;
    looking up, by the router, the second table entry according to the IP address of the next hop in the first table entry; and
    forwarding, by the router, the first IP packet according to the destination MAC address of the second table entry.

2. The method of claim 1, wherein:
    the IP address of the first network element is an IP address of a first interface of the first network element; the MAC address of the first network element is a MAC address of the first interface of the first network element; and the router communicates with the first network element via the first interface.

3. The method of claim 1, wherein:
    the acquiring, by the control plane of the router, the IP address and the MAC address of the first network element via the PPPoE comprises:
    receiving, by the router, a discovery message sent by the first network element, wherein the discovery message carries the IP address of the first network element and the MAC address of the first network element.

4. The method of claim 1, wherein:
    the router and the first network element are connected via an IP layer network accessing device.

5. A method for sending an Internet Protocol (IP) packet, comprising:
- acquiring, by a control plane of a first network element, an IP address and a media access control (MAC) address of a router via Point-to-Point Protocol over Ethernet (PPPoE);
- sending, by the control plane of the first network element, the IP address of the router to a routing forward table in a data plane of the first network element to generate a third table entry; wherein a destination IP address of the third table entry is a first network segment address; the first network segment address covers an IP address of a second network element; an IP address of a next hop in the third table entry is the IP address of the router; and the IP address of the second network element and the IP address of the first network element are in different network segments;
- sending, by the control plane of the first network element, the IP address and the MAC address of the router to an Address Resolution Protocol (ARP) buffer table in the data plane of the first network element to generate a fourth table entry; wherein a destination IP address of the fourth table entry is the IP address of the router, and a destination MAC address of the fourth table entry is the MAC address of the router;
- sending, by the first network element, a second IP packet to the second network element via the router, comprising:
- looking up, by the first network element, the third table entry according to a destination IP address of the second IP packet;
- looking up, by the first network element, the fourth table entry according to the IP address of the next hop in the third table entry; and
- sending, by the first network element, the second IP packet according to the destination MAC address of the fourth table entry, wherein the destination IP address of the second IP packet is the IP address of the second network element.

6. The method of claim 5, wherein:
the IP address of the router is an IP address of a second interface of the router; the MAC address of the router is a MAC address of the second interface of the router; and the first network element communicates with the router via the second interface.

7. The method of claim 5, wherein:
the router and the first network element are connected via an IP layer network accessing device.

8. The method of claim 5, wherein:
the acquiring, by the control plane of the first network element, the IP address and the MAC address of the router via the PPPoE comprises:
sending, by the first network element, a discovery message to the router; wherein the discovery message carries the IP address of the first network element and the MAC address of the first network element.

9. A router for sending an Internet Protocol (IP) packet, comprising:
- a memory non-transitory storage medium; and
- a processor, wherein the memory non-transitory storage medium has stored therein a program which when executable by the processor,
- the processor comprising:
- a first acquisition unit, configured to acquire an IP address and a media access control (MAC) address of a first network element via PPPoE;
- a first table entry generation unit, configured to send the IP address of the first network element to a routing forward table in a data plane of the router to generate a first table entry, wherein a destination IP address of the first table entry is the IP address of the first network element and an IP address of a next hop in the first table entry is the IP address of the first network element; a second table entry generation unit, configured to send the IP address and the MAC address of the first network element to an Address Resolution Protocol (ARP) buffer table in the data plane of the router to generate a second table entry, wherein a destination IP address of the second table entry is the IP address of the first network element, and a destination MAC address of the second table entry is the MAC address of the first network element;
- a routing message advertising unit, configured to advertise a routing message to a neighbor router of the router, wherein the routing message comprises the IP address of the first network element;
- a receiving unit, configured to receive a first IP packet forwarded by the neighbor router, wherein a source IP address of the first IP packet is an IP address of a second network element, a destination IP address of the first IP packet is the IP address of the first network element and the IP address of the first network element and the IP address of the second network element are in different network segments; and
- the program causes the processor to look up the first table entry according to the destination IP address of the first IP packet; look up the second table entry according to the IP address of the next hop in the first table entry; and forward the first IP packet according to the destination MAC address of the second table entry.

10. A non-transitory storage medium of a router for sending an Internet Protocol (IP) packet, wherein the non-transitory storage medium has stored therein a program which when executed by the processor, causes the processor to:
- acquire an IP address and a media access control (MAC) address of the router via PPPoE;
- send the IP address of the router to a routing forward table in a data plane of a first network element to generate a third table entry; wherein a destination IP address of the third table entry is a first network segment address, the first network segment address covers an IP address of a second network element, an IP address of a next hop in the third table entry is the IP address of the router and the IP address of the second network element and the IP address of the first network element are in different network segments;
- send the IP address and the MAC address of the router to an ARP buffer table in a data plane of the first network element to generate a fourth table entry; wherein a destination IP address of the fourth table entry is the IP address of the router, and a destination MAC address of the fourth table entry is the MAC address of the router; and
- send a second IP packet to the second network element via the router; look up the third table entry according to a destination IP address of the second IP packet; look up the fourth table entry according to the IP address of the next hop in the third table entry; and send the second IP packet according to the destination MAC address of the fourth table entry; wherein the destination IP address of the second IP packet is the IP address of the second network element.

* * * * *